(No Model.)  F. LINDNER.  5 Sheets—Sheet 2.
MEAT CUTTING MACHINE.
No. 270,319. Patented Jan. 9, 1883.
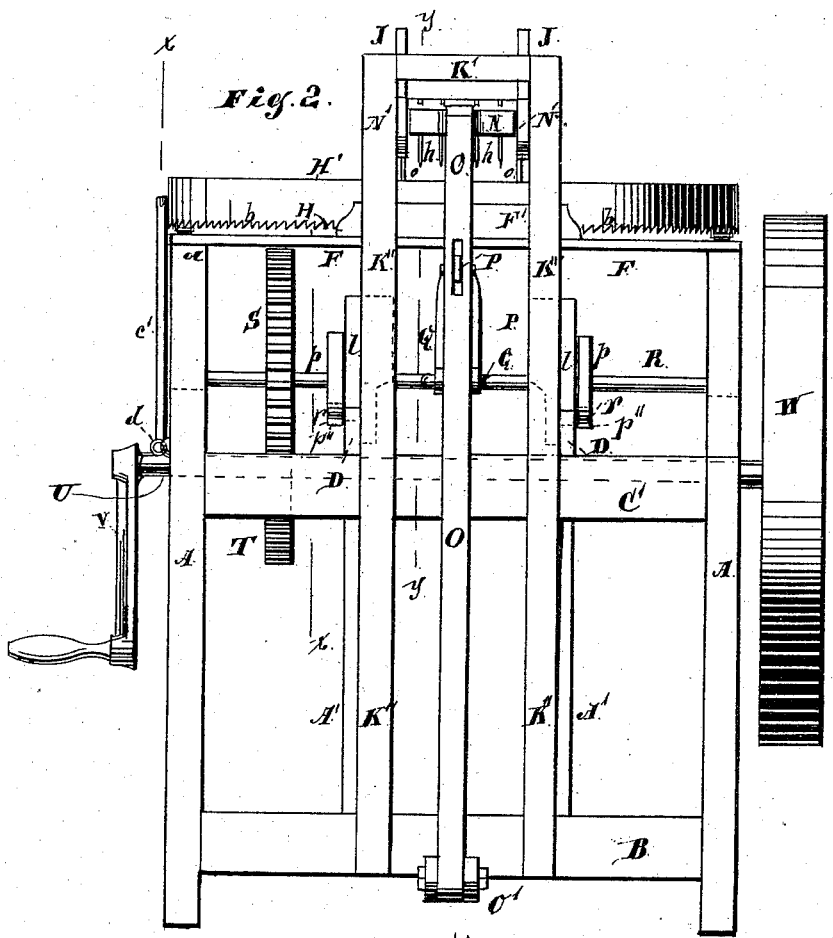
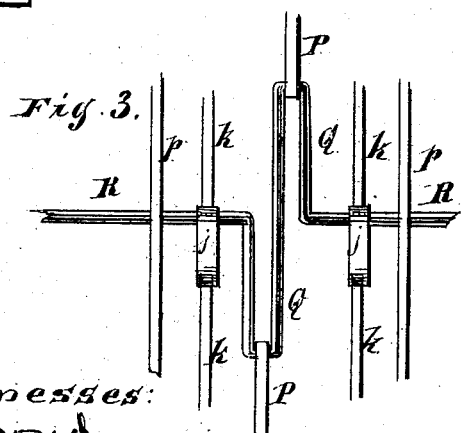
Witnesses:
O. W. Bond.
Albert H. Adams.
Inventor:
Ferotin and Lindner (No Model.)  5 Sheets—Sheet 3.

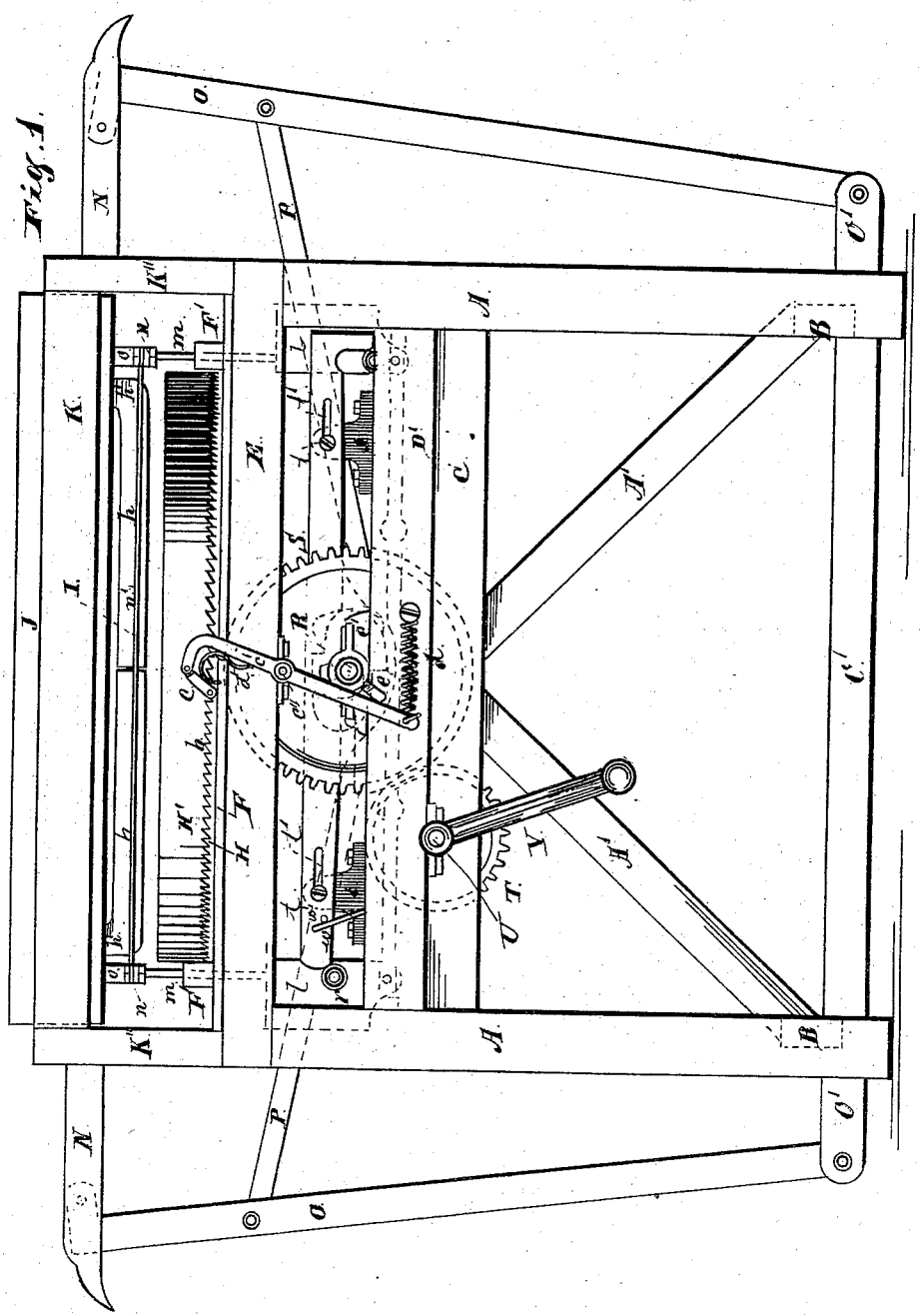

F. LINDNER.
MEAT CUTTING MACHINE.

No. 270,319.  Patented Jan. 9, 1883.

Witnesses:
O. W. Bond.
Albert H. Adams.

Inventor:
Ferdinand Lindner (No Model.)  5 Sheets—Sheet 4.
F. LINDNER.
MEAT CUTTING MACHINE.
No. 270,319.  Patented Jan. 9, 1883.
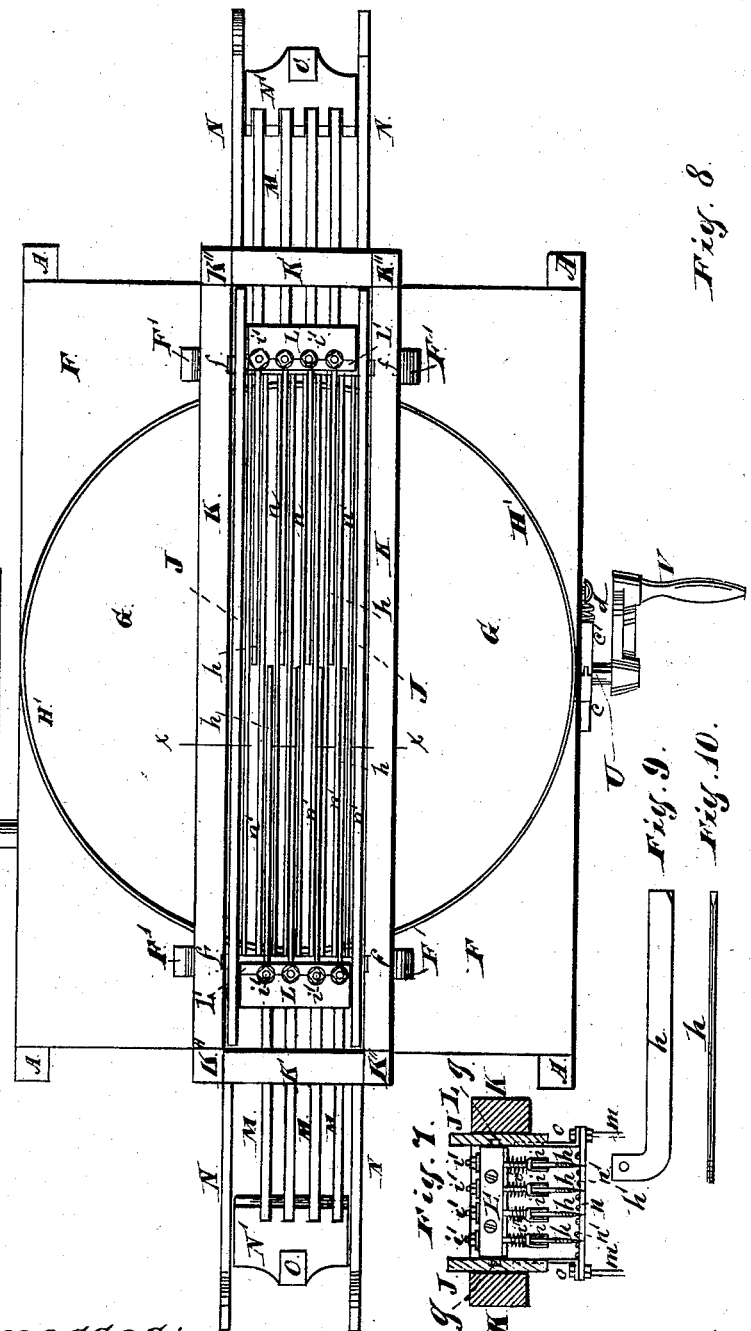
Witnesses:
O. W. Bond
Albert H. Adams
Inventor:
Ferdinand Lindner
N. PETERS, Photo-Lithographer, Washington, D. C.

(No Model.) 5 Sheets—Sheet 5.
F. LINDNER.
MEAT CUTTING MACHINE.
No. 270,319. Patented Jan. 9, 1883.
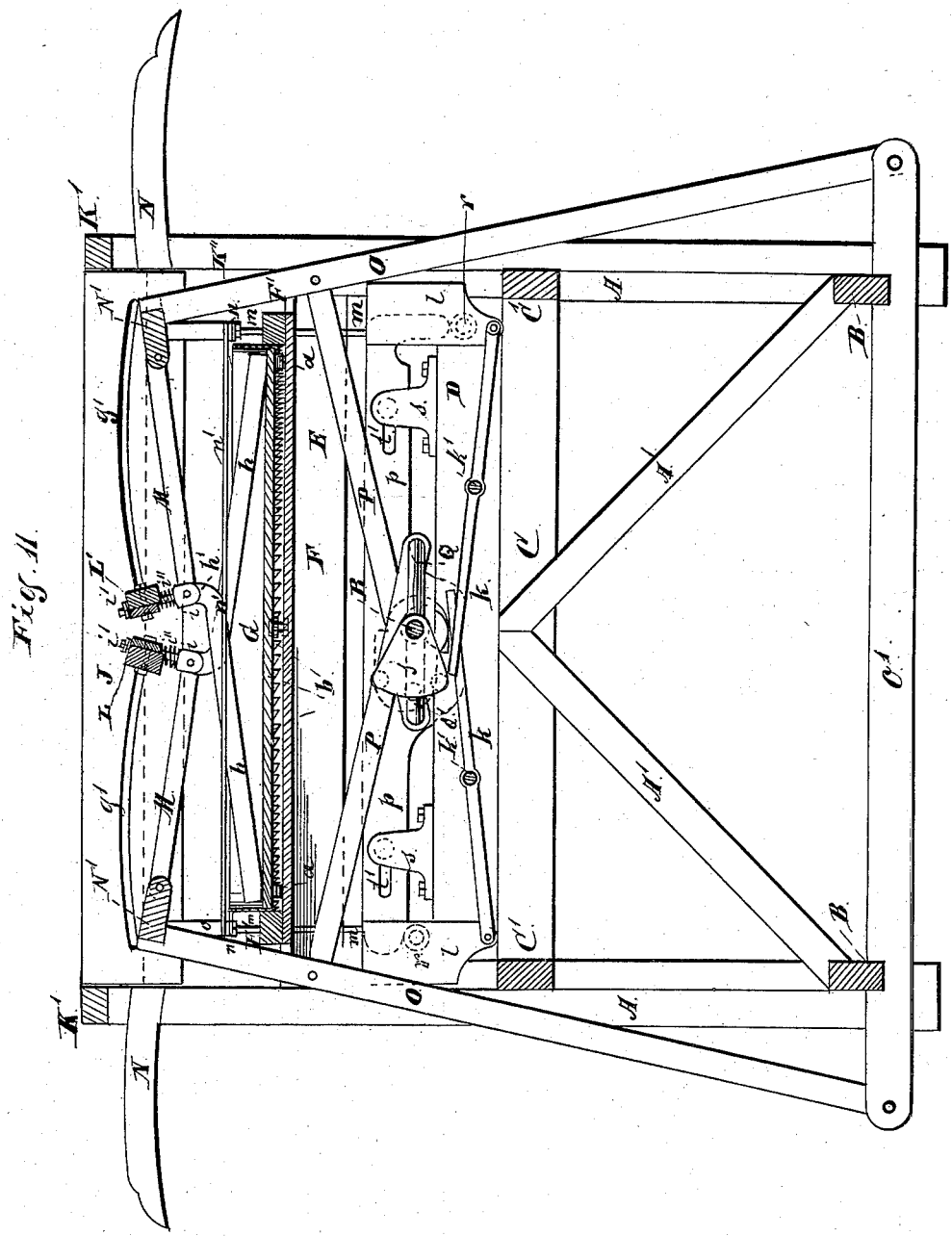
Witnesses:
O. W. Bond.
Albert H. Adams.
Inventor:
Ferdinand Lindner.

UNITED STATES PATENT OFFICE.

FERDINAND LINDNER, OF CHICAGO, ILLINOIS, ASSIGNOR TO HIMSELF, EDWARD MELCHIOR, JULIUS CLEMENS, AND CHARLES FINKENSIEPER, ALL OF SAME PLACE.

MEAT-CUTTING MACHINE.

SPECIFICATION forming part of Letters Patent No. 270,319, dated January 9, 1883.

Application filed May 26, 1882. (No model.)

*To all whom it may concern:*

Be it known that I, FERDINAND LINDNER, residing at Chicago, in the county of Cook and State of Illinois, and a citizen of the United States, have invented new and useful Improvements in Machines for Cutting Meats, &c., of which the following is a full description, reference being had to the accompanying drawings, in which—

Figure 4:
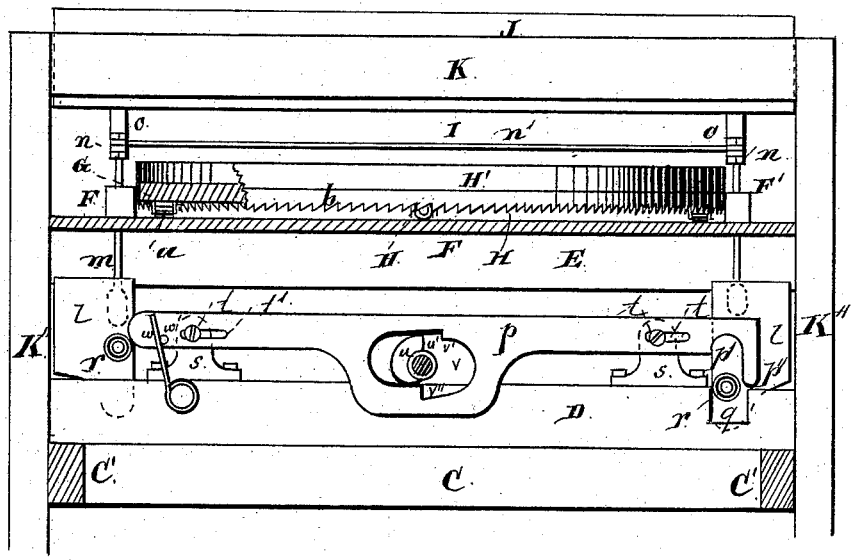
Figure 5:
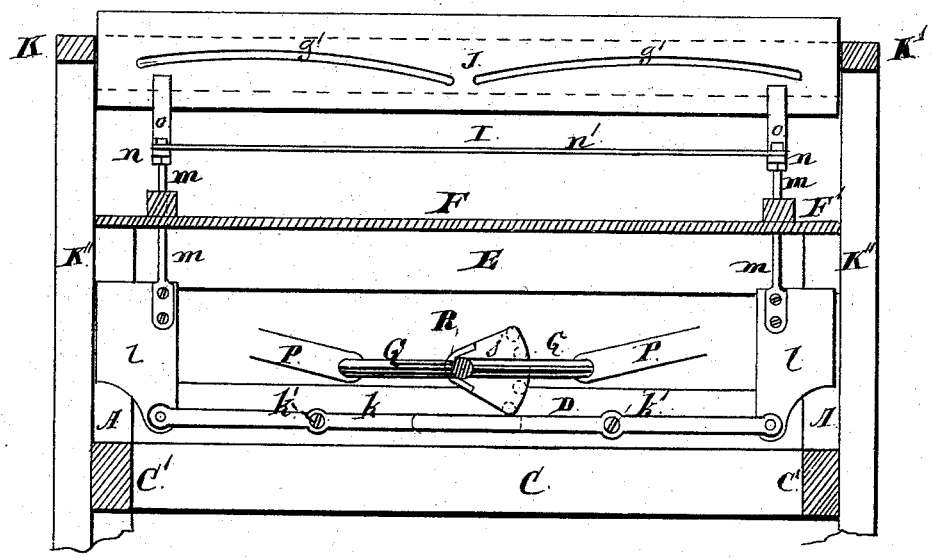

Figure 1 is a side elevation; Fig. 2, an end elevation; Fig. 3, a detail, showing the crank-shaft and the devices connected therewith for raising the frame and knives and holding the frame when down; Fig. 4, a detail in elevation of the cutting-table and the devices for holding the knives down to their work, and showing a portion of the frame-work and the supporting-platform in section; Fig. 5, a detail in elevation of the devices for elevating the frame and knives, showing also the frame-work, supporting-platform, and crank-shaft in section; Fig. 6, a top or plan view; Fig. 7, a detail in section, showing the frame-work for supporting the knives with the cross-head carrying the knives and the knives in elevation, showing also the grate for holding the material down; Fig. 8, a detail of the side pieces in which the knife-head rides and is supported; Figs. 9 and 10, details, being respectively a side and edge view of one of the knives. Fig. 11 is a central vertical section endwise of the machine, showing the knives advanced and in position to commence the cutting, and the actuating devices in a corresponding position.

This invention relates to machines primarily designed to be used in cutting sausage-meat; but it can be used for cutting other material and for other purposes, and has for its objects to produce a perfect and clean cut, by which the meat or other material will be minced or cut fine without being jammed or mashed in the process of cutting, and have the cutting performed through the entire mass of material, leaving no uncut or jammed portion at the bottom; and to construct a machine by which the above results will be attained in a thorough and efficient manner, as hereinafter more specifically described. These objects I accomplish by the mechanism illustrated in the drawings, and which I will now proceed to describe in detail.

In the drawings, A represents the corner-posts or uprights, of wood or any suitable material; B, bottom rails, extending from post to post on the ends of the frame; C, side rails, extending from post to post; C', end rails, extending from post to post; D, cross-bars supported at the end on the end rail, C', and running parallel to the side rails, C; E, top side rails, extending from post to post. These parts, A, B, C, C', D, and E, form the supporting frame-work for the cutting-table and the actuating devices by which the knives and their frame are operated, and such frame-work may be of the form of construction and arrangement shown, or other form of construction and arrangement suitable to receive and support a cutting-table and the devices for operating the knives and their frame; and, as shown, the cross-bars D are supported at their centers by brace-bars A', running up diagonally from the end pieces, B, for the purpose of giving additional support at the point where the operating-shaft is located.

F is a platform located on top of and secured to the upper side pieces, E; F', headers or blocks located on the platform F at the center and near each end, and secured thereto in any suitable manner; G, cutting-table, of a round or circular form, as shown in Figs. 1, 2, 4, and 6, the diameter of which can be varied to suit the capacity of the machine and the length of the knives and stroke used. This table G is pivotally supported at its center upon a platform, F, so as to turn or revolve, and is supported at its outer edge or periphery by anti-friction rollers or wheels *a*, which travel on the upper face of the platform F, the rollers, as shown, being attached to the table or bed; but, if desired, they might be attached to the face of the platform, and the table travel on them.

H is a metal rim, encircling the lower portion of the periphery of the table G, and extending below the bottom of such table, and provided on its edge with notches or teeth *b*, with which a pawl, *c*, engages. This pawl *c* is pivoted to the upper end of an arm or lever, *c'*, which lever is pivoted by a suitable pin or pivot, *c''*, to the side bar or piece, E, and its lower end has connected therewith one end of a spring, $d$, the other end of which spring is fastened by a screw or pin to one of the bars D', as shown in Fig. 1. The pawl $c$ is held in engagement by a spring, $d'$, attached to the edge of the arm or lever $c'$, and arranged to have its free end bear or push against the pawl, so as to hold it in engagement and at the same time allow it to slide over the teeth for a new engagement. The arm or lever $c'$ is swung or turned on its pivot $c''$ by a pin, $e$, which is screw-threaded, the screw-threaded end entering a hub, $e'$, or ring on the end of the crank-shaft, so that by the revolution of the shaft the end of the pin will be brought in contact with the edge of the lever and throw its upper end forward to cause the pawl to advance the table G, and the distance advanced is regulated by adjusting the screw $e$, so as to make it longer or shorter, and cause the pawl $c$ to pass a greater or less number of teeth at each engagement. Other means than the pin could be used for operating the lever $c'$. The spring $d$ returns the lever $c'$ after each advance to its normal position, ready for the next advance, and instead of using a spring, $d$, arranged as shown, other forms of spring, arranged differently, could be used for the purpose of returning the lever.

H' is a metal rim encircling the upper portion of the periphery of the table, and projecting above the top of the same, and forming a guard or stop to prevent the meat from being drawn off the bed. As shown in Fig. 4, the metal bands H H' are made separate; but they could be made in one piece, as shown in Fig. 1, equally as well.

I is a grate or pressure frame, formed of rods or bars $n'$, supported at each end on cross heads or bars $n$. This grate is somewhat longer than the diameter of the table G, and is located above such table, and is formed so as to leave spaces between the bars $n'$.

J are side bars or pieces, located above the grate I and on each side thereof, and provided with lugs or guides $f$—one at each end of each bar—as shown in Fig. 6. These bars J are each provided with a curved groove, $g'$, of the form shown in Fig. 8, having a depressed portion at the center, where the two sections of the groove meet.

K are side pieces, joined at their ends by cross-pieces K', and supported on the upper ends of standards or posts K'', secured to the end pieces of the main frame, which posts or standards are longer than the posts or standards of the main frame, so as to support the frame K K' at the proper distance above the table or bed G. The side pieces, K, of this secondary frame are provided with suitable slots to receive the guides $f$ of the side bars, J, so as to allow such bars to have a free vertical movement.

L are cross-heads—one at each end of the machine—and supported in the side bars, J, by rollers $g$ on each end of each cross-head, which rollers enter the respective sections of the grooves $g'$ in the side bars or pieces, J, as shown in Fig. 7. Each cross-head supports or carries a series of knives, $h$, four, as shown in Fig. 7, but a greater or lesser number could be used, according to the capacity which it is desired the machine should have. Each knife is composed of a blade and a heel or shank, $h$, having an opening therein, by means of which and a suitable pin each knife is rigidly attached to a separate fork or slotted head, $i$, rigidly fixed to a stem, $i'$, which passes up through the head L, and is screw-threaded at its upper end to receive a nut, by means of which the knife can be adjusted higher or lower in relation to the bed or table G, and, as shown, each knife is made yielding by a spring, $i''$, located around the shank or stem of the head $i$, between such head and the under face of the cross-head L, as shown in Fig. 7. While the knives can slightly yield, owing to the springs $i''$, their connection with the cross-heads is sufficiently rigid to compel them to follow the movements of the cross-heads as they travel in the grooves $g'$, the edges of which grooves, through the cross-heads, act to keep the knives down to proper working position relative to the table. As shown, the several stems of the slotted heads for the knives are held in position by a metal plate, L', attached to the face or edge of the cross-head L, by removing which the stems can be readily removed for the purpose of sharpening or repairing the knives; but this plate L' could be omitted and the stems passed through the cross-head L and removed therefrom by unloosening the nuts. These knives $h$ are located and arranged to pass between the openings of the cross-bars $n'$, the knives at each end occupying alternate openings, so that they do not coincide, but can pass each other in operation.

M are connecting bars or links, attached at their inner ends to the cross-head L by suitable pins or pivots, and at their outer ends pivotally connected with a cross-head, N'. Two cross-heads, N' N', with connecting bars or links M, are provided—one at each end of the machine—for operating the respective cross-heads carrying the cutting-knives.

N are guide rails or bars, between which the cross-heads N' are located and by which they are kept in a direct line of travel. These bars N extend out from the upper ends of the standards or supports K'' the distance required for the travel of the cross-heads N' on each end of the machine.

O are levers or arms—one on each end of the machine—the upper end of each lever being connected to the cross-head N' on its end of the machine. These levers at the lower ends are pivoted in the ends of a cross bar or piece, O', secured to the end pieces, B, of the frame, so that their upper ends are free to swing in and out and produce a sliding movement of the cross-heads N', respectively, and through such cross-heads and the connecting-links M advance and recede the cross-heads L, respectively, with their knives or cutters h.

P are connecting-links or pitmen—one for each lever or arm O. The outer end of each connecting-link or pitman P is pivotally connected with its arm or lever, and their inner ends are each connected to a crank by journals or otherwise. Q are the cranks—one for each pitman or connecting-link P.

R is a shaft having the cranks Q formed therewith or attached thereto. This shaft is supported in suitable boxes or bearings attached to the cross-pieces D, as shown, and one end extends beyond the cross-bars D', and has attached thereto the hub or ring $e'$, which carries the pin $e$, by which the arm or lever $c'$ is operated. The cranks Q are to be of sufficient length to give the required throw to the upper end of each arm or lever O to operate the cutting-knives or cutters.

S is a gear-wheel suitably attached to the shaft R; T, a gear-wheel meshing with the wheel S; U, a shaft supported in suitable bearings in the side pieces, C, of the frame, and on which is the gear-wheel T; V, a crank attached to one end of the shaft U, for revolving the shaft and communicating motion to the gears T S, and from such gears to the crank-shaft R; W, the fly-wheel on the opposite end of the shaft U from the crank V.

The shaft R on the outside of each crank Q is provided with a cam, $j$, the outer acting face or edge of which is curved and engages with the upper face of an arm or lever, $k$, pivoted by a pin or bolt, $k'$, to the inner face of the cross-piece D, the outer end of which arm or lever is pivoted to the lower end of a head or block, $l$. A block, $l$, arm or lever $k$, and cam for engaging the inner end of the arm or lever is provided for each end of the machine, as shown in Fig. 5. The upper end of each block $l$ has attached thereto on each side a rod or bar, $m$, which extends up and passes through the platform F and headers F', and are connected at their upper ends to the cross-bars $n$ of the grate or pressure frame, the ends of the rods passing through the ends of the cross-heads and being held in position by suitable nuts. The cross-heads $n$ at each end of the grate or pressure frame are attached to the side bars, J, by straps or bars $o$, the upper ends of which are secured to the side bars, J, and the lower ends attached to the cross-heads by the end of the rods or bars $m$, which pass through them, so that the side bars or frame for the knives and the grate or pressure frame are connected so as to move together, and are both moved by the same devices, consisting of the heads or blocks $l$, levers or arms $k$, and cams $j$.

On each cross-bar D is supported a bar, $p$, by brackets or standards $s$, attached to the upper face of the bar D. Each bar $p$ is attached to its brackets or supports $s$ by a screw or bolt, $t$, the stem or shank of which passes through a slot, $t'$, a bolt and slot being provided for each end of the bar. Each bar $p$ encircles at its center the shaft R, and they are so located as to come outside of the cams $j$, and are arranged to have their ends engage with a roller, $r$, located on each head or block $l$, on the opposite side to that on which the arms or levers $k$ are pivoted. The roller on one of the blocks $l$ is located in a higher plane than the roller on the other block, and the end of the bar $p$, which is to engage the roller $r$, which is located in the lowest plane, is provided with a notch or recess, $p'$, and an extension, $p''$, the end of which, when the knife-frame is down, is in line with the upper edge of the roller. This slot or opening $p'$ is necessary in order to allow a vertical play of the knife-frame, and the bars $p$ are for the purpose of engaging the rollers $r$ and locking or holding the frame down for the knives or cutters to do their work, the ends of each bar passing over its roller $r$ to do the locking. These bars $p$ have a reciprocating movement to cause them to engage the rollers $r$ or be disengaged therefrom, and this movement of the bars, as shown, is produced by cams $u$—one for each bar—located on the shaft R, the end face, $u'$, of which engages with the projection or face $v'$, formed in the elongated slot $v$, encircling the shaft R, which engagement of the faces $u'$ $v'$ reciprocates the bar, so as to disengage the ends from the rollers $r$, and this face $u'$, as the shaft R revolves, engages the projection or face $v''$, also formed in the slot $v$ on the opposite side to the end or face $v'$, and advances the bar, projecting the ends thereof over the rollers $r$. The receding movement of the bar occurs just before the knife-frame is raised, and the advance movement occurs just after the knife-frame has descended into position for use.

The knife-frame is raised by the action of the cams $j$, the levers $k$, heads or blocks $l$, and connecting-rods $m$ $o$, as before described, and it is lowered or dropped by the weight of the frame when the cams $j$ are released from their engagement with the arms or levers $k$.

The operation is as follows: The meat or other material to be cut is placed on the bed or table G, and movement is imparted to the crank-shaft R through the crank V, shaft U, and gear T S. The rotation of the shaft R causes its cranks Q to give a reciprocating movement to the connecting links or pitmen P on each side, and these pitmen oscillate the arms or levers O, the outer movement of each pitman carrying the upper end of each arm or lever outward, and the inner movement of the rod or pitman carrying the upper end of these levers inward, and this outward and inward movement of the levers O, through the head N' and connecting links or bars N, reciprocates the cross-heads L, by which the series of knives are carried. This reciprocating movement is simultaneous with both cross-heads, L—that is, as one advances the other advances, and as one recedes the other recedes. When the cross-heads L are making their advance movement the cam $j$ is engaged with the arms or levers $k$, raising the bars J with the knives, the engagement of the cams commencing at or about the time the forward movement of the cross-heads L commences, and continuing during such advance movement, the cams passing from the ends of the arms at or about the time the advance of the cross-heads ceases. As the cams $j$ pass from the arms or levers $k$, the weight of the frame and knives will cause them to drop by gravity, bringing the bars $n'$ of the grate over the material on the bed or table, and holding such material down for the action of the knives, and the frame and knives are held down by the bars $p$, the ends of which are advanced, and operate to engage the rollers $r$ by the engagement of the face $u'$ with the face $v''$, which engagement occurs as the frames and knives reach their lowest point of descent. When the frame has descended the cross-heads L are receded by the reversed action of the cranks Q, which, through the pitmen P, throw the upper ends of the arms or levers outward, and this receding movement of the cross-heads will cause the knives, which are carried thereby, to be drawn across the material on the bed or table G, cutting such material with a draw-cut, and in order to permit of the necessary movement of the knives in the advancing and receding movements, the slots $g'$ for the rollers $g$ are given the upward curve shown, which curve causes the forward end of the knife to be thrown slightly downward, so as to enter and pass entirely through the material on the bed or table. When the receding movement of the cross-head is finished, the face $u'$ of the cam $u$ strikes the face $v'$ and disengages the end of the bar $p$ from the rollers $r$, leaving the knife-frame free to be elevated, and at the same time the cams $j$ engage the arms or levers $k$ and commence to elevate the knife-frame, the inward movement of the cross-head L also commencing to again advance the knife, when the same operation is repeated. At each advance of the knives the table or bed is carried around by the action of the pawl $c$, through the engagement of the lever $c'$, by the pin $e$, so that the next cutting action of the knives will occur in a separate place from that of the preceding cut.

The operation is to be continued until the meat or material is reduced to the required fineness, when it can be removed from the table or bed, and a new supply to be placed thereon and cut in the same manner.

The machine can be operated by either hand or other power, as may be most convenient, through the crank V or other means.

As shown, a series of knives or cutters is provided for each end of the machine, with actuating devices for each, but such knives or cutters could be arranged to work from one end only, in which event the cutting would not be as rapid as by having the knives or cutters work from both ends.

I do not confine myself to the special means herein described and shown for confining the material while being cut. The pressure grate or frame I effects this in an efficient and simple manner, and the upright encircling rim H' serves to prevent the material from being drawn from the table while being acted on by the knives. When two sets of knives reciprocate in opposite directions, as hereinbefore described, their opposing action, when advancing toward each other, will be sufficient to confine the material while being cut; but when a single set of knives is used it is desirable to provide some suitable means to act on the material to confine or hold it while being cut. The grate or pressure frame efficiently accomplishes this end, and it can be used with one or both sets of the knives.

As shown, two cams, $j$, and levers $k$, are provided for raising the knife-frame and knives; but a single cam and a single lever to each head or block could be used, and, as shown, two sliding bars, $p$, for locking the frame and knives down, are used, but a single one could be provided, and these devices for raising the frame and knives and locking it down could be of some other form of construction and arrangement than that shown, as, for instance, an eccentric located on the crank-shaft, with a connecting-rod or pitman running to the frame, could be used.

Instead of using a number of bars, M, to make the connection between the cross-heads L and N', a single bar could be used, having sufficient width to resist the pressure and produce a straight line of travel. As shown, a spring, $w$, attached to the cross-beam D, and having its free end engaging with a pin, $w'$, on the sliding bar $p$, is provided for each bar for the purpose of returning the bars quickly, in order to clear the rollers from engagement; but the spring $w$ is not necessary, and can be dispensed with, if so desired. In the construction of frame-work shown, the cross-bars D, in line with the rollers $r$, are provided with a recess, $q$, to enable the block $l$ to descend the required distance to draw the frame and knives down to working position; but by setting the cross-bars wider apart or setting the blocks farther inward the roller $r$ could be made to clear the cross-bars, and the recess $q$ be then dispensed with.

What I claim as new, and desire to secure by Letters Patent, is—

1. The combination of a table for receiving the material to be cut, a series of movable knives, mechanism for reciprocating the knives and automatically raising and lowering them at determined intervals during their reciprocations, and suitable means whereby the material is confined or held while being cut, substantially as described.

2. The combination of a table for receiving the material to be cut, a series of inclined knives for producing a draw-cut, mechanism for reciprocating the knives and automatically raising and lowering them at determined intervals during their reciprocations, and means whereby the material is confined while being cut, substantially as described.

3. The combination, with a table for receiving the material to be cut, of a frame carrying inclined knives, mechanism for reciprocating the knives and automatically raising and lowering the knife-carrying frame at determined intervals during the reciprocations of the knives, and means whereby the material is confined while being cut, substantially as described.

4. The combination of a table for receiving the material to be cut, means for rotating the table, a series of inclined knives, mechanism for reciprocating the knives and automatically raising and lowering them at determined intervals during their reciprocations, and means whereby the material is confined while being cut, substantially as described.

5. A machine for mincing meat and other material, combining in its structure a table for carrying the material, a series of inclined knives alternating with each other and some adapted to pass between the others in their movements, and means for reciprocating the knives toward and from the center of the table, substantially as described.

6. The combination of a table for receiving the material to be cut, a series of inclined knives alternating with each other and some adapted to pass between the others in their movements, and mechanism for reciprocating the knives and automatically raising and lowering them during their reciprocations, substantially as described.

7. The combination of a table for receiving the material to be cut, two cross-heads, each carrying a series of inclined knives, and means for reciprocating the cross-heads in opposite directions, substantially as described.

8. The combination of a table for receiving the material to be cut, two cross-heads, each carrying a series of inclined knives, those on one cross-head alternating with those on the other, and mechanism for reciprocating and raising and lowering the cross-heads, substantially as described.

9. The combination of a table for receiving the material to be cut, the grate or pressure-frame located above the table, the frame located above the grate or pressure-frame, the cross-heads supported by the frame, which is above the grate or pressure-frame, and carrying knives which are provided with inclined cutting-edges to produce a draw-cut, and mechanism for reciprocating the cross-heads on their supporting-frame, substantially as described.

10. A bed or table carrying the material to be cut, in combination with the bars or frame J, links or straps o, rods n, heads or blocks l, arm or lever k, and cam j, for raising the frame or support J, substantially as and for the purpose specified.

11. A bed or table carrying the material to be cut, a grate or pressure-frame, I, and a vertical sliding frame, J, in combination with cross-heads L, carrying the knives or cutters, links M, cross-heads N', guides N, arms or levers O, bars or pitmen P, cranks Q, and revolving shaft R, substantially as and for the purpose specified.

12. A sliding bar p, in combination with the rollers r, heads or blocks l, rods m, cross-bars n, straps o, frames J, cross-heads L, carrying the knives, and means for reciprocating the cross-heads, substantially as and for the purpose described.

13. The combination of the supporting-frames J, the cross-heads L, carried by the said frames, the inclined cutting-knives connected at one end with the cross-heads by a yielding connection, and mechanism for reciprocating the cross-heads, substantially as described.

14. The combination of the grate or pressure-frame I, the cross-heads L, the frame J, supporting the latter, and mechanism for reciprocating the cross-heads and automatically raising and lowering the grate or pressure-frame, substantially as described.

15. The bars p and cam u, having an end face, u', to engage the faces v' v'' on the bars, in combination with the rollers r, heads or blocks l, rods m, straps o, and frame or bars J, carrying the knives, for holding the knives down to their work and releasing the frame at the completion of the cutting, substantially as specified.

16. The sliding bars p and arms or levers k, in combination with a sliding frame or support, carrying the knives and cutters, and intermediate devices connecting the frame with the sliding bars and the said arms or levers K for locking the frame down during the cutting operation and raising the frame for the next succeeding cutting, substantially as specified.

FERDINAND LINDNER.

Witnesses:
   ALBERT H. ADAMS,
   O. W. BOND.